Figure 1:
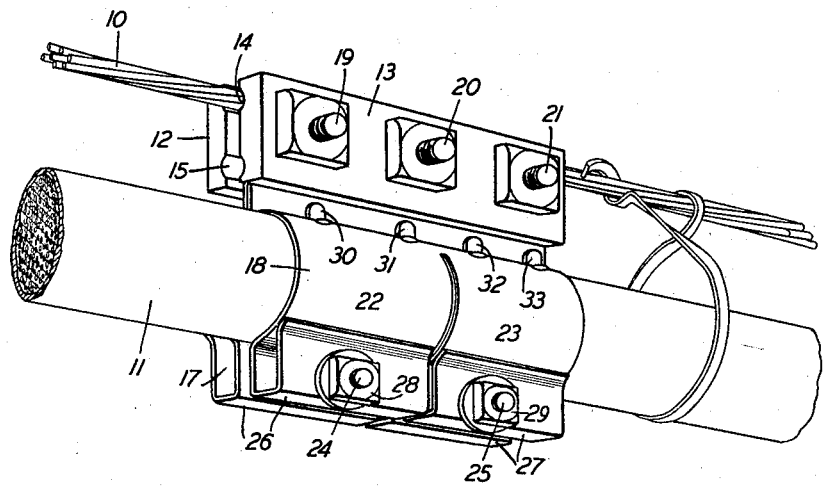

Aug. 23, 1932.  E. ST. JOHN  1,873,357

GRADE CLAMP

Filed March 2, 1931

INVENTOR
E. ST. JOHN
BY J. MacDonald
ATTORNEY

Patented Aug. 23, 1932

1,873,357

UNITED STATES PATENT OFFICE

EVERETT ST. JOHN, OF WESTPORT, CONNECTICUT, ASSIGNOR TO BELL TELEPHONE LABORATORIES, INCORPORATED, OF NEW YORK, N. Y., A CORPORATION OF NEW YORK

GRADE CLAMP

Application filed March 2, 1931. Serial No. 519,442.

This invention relates to supporting devices and more particularly to means for suspending electrical transmission cables from a messenger or supporting strand which is firmly attached to poles spaced at suitable intervals along a transmission line.

The object of this invention is to provide a means which will grip the cable sufficiently to prevent it from slipping when the messenger strand is on an angle or a down grade and yet not injure the cable sheath.

For some time past it has been customary to support aerial cables on a down grade by means of a grade clamp which consisted of a pair of heavy steel or malleable iron side pieces, these side pieces being provided with bolts which secured them together around the strand and the cable at the same time. A groove for the supporting strand was provided in the upper part of the side members while the lower portion of the clamp was formed to provide an opening for the cable, the groove for the strand and the opening for the cables so spaced that the cable would be supported at its normal distance from the strand.

In order that various sizes of cable could be used in the one size of clamp it was necessary to provide bushings of cable sheath which could be placed around the cable in order that the clamp would exert the proper amount of friction on the cable to be supported. When the upper bolts of the clamp were tightened it caused the clamp to grip both the strand and the cable sheath. This type of clamp is highly objectionable due to the fact that pressure may be very easily exerted, with the lineman's wrench used for tightening these bolts, to distort the cable seriously, since there is no way of telling when the clamp has been tightened sufficiently to grip the strand. Furthermore, at least two of the bolts must be removed in order to place the clamp around the strand and the cable. Therefore, considerable time is consumed in fitting the cable in the clamp and also fitting the bushings in the clamp around the cable.

With these points in mind, the present supporting device has been designed by the applicant in which the clamping of the cable and the clamping of the strand are two separate and distinct operations since the device may be securely tightened to the strand without gripping the cable. The cable may be then secured in the lower portion of the device without the use of a bushing. Applicant's device may be installed without removing any of the nuts and it cannot injure the cable sheath in any way.

An object of this invention is to provide a supporting device for aerial cables in which the means for securing the supporting device to the strand is wholly independent of the means for securing the cable in the device.

A further object of the present invention is the provision of a supporting device which may be easily and quickly installed with a minimum amount of labor.

A still further object of this invention is to provide a supporting device for aerial cables which will readily conform itself to the slight irregularities found in the cable sheath.

A still further object of this invention is a supporting means for aerial cables which provides a greater area of contact with increased friction between the clamp and the cable sheath than has heretofore been possible.

Applicant's improved device comprises a pair of clamping members having longitudinal grooves therein, one pair of which is adapted to engage the messenger strand and the other pair adapted to engage the upper edges of the members which surround the cables to be supported. The members which surround and grip the cable comprise two sheet steel side pieces having at their upper edges longitudinal ribs, the lower edges of said members are bent back, and secured to the outside walls of said side members by spot welding, to form a channel. These two side members are so formed so as to conform to the shape of the cable. The clamp above referred to is arranged to grip the strand and the upper edges of the two pressed steel side pieces which encircle the cable. Each side of said side members is divided into two clamping portions by means of a suitable slot cut therein. These clamping portions are tightened separately by bolts which pass through the lower edge or channel shaped portion. This particular construction coupled with the fact that the side pieces are made of comparatively thin sheet steel permits the clamp to conform to slight irregularities in the cable sheath and also insures a greater area of contact with increased friction than could be obtained with a continuous side piece.

Figure 2:
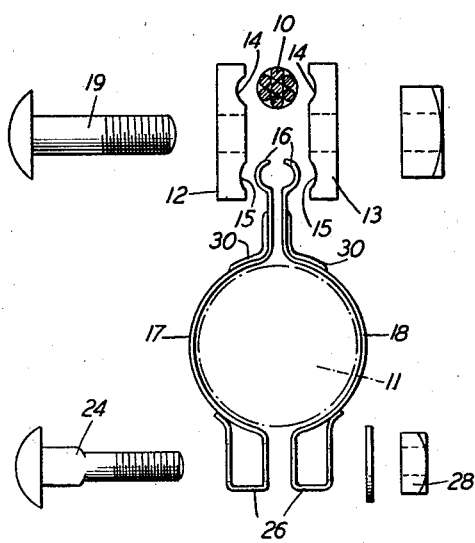

Referring now to the drawing,

Fig. 1 illustrates in perspective the cable supporting device attached to a messenger wire and supporting a section of aerial cable, and Fig. 2 is an exploded end view of the device with the cable removed.

Referring now to Fig. 1, 10 represents a messenger or supporting strand from which the cable 11 is adapted to be suspended by means of a supporting device which grips the cable 11 independently of the means which secures the device to the strand.

The supporting device as shown in Fig. 1 comprises a pair of elongated clamping members 12 and 13, these clamping members have longitudinal grooves 14 and 15 located along their upper and lower edges, the upper groove 14 being adapted to receive the messenger or supporting strand 10 and the lower groove 15 adapted to receive the upper edge 16 of the members 17 and 18 which surround the cable to be supported. Located in the members 12 and 13 are a plurality of bolts 19, 20 and 21. These bolts when tightened secure the strand 10 in the upper groove 14 and the edges 16 of the members 17 and 18 in the lower groove 15. This tightening action, however, has no effect on the cable 11 and only serves to secure the supporting device to the strand 10.

The members which surround and support the cable 11 comprise two sheet steel side pieces 17 and 18 formed to conform to the shape of the cable 10. Each of said side pieces is divided into two portions 22 and 23. This provides a plurality of clamping surfaces which are tightened separately by means of the bolts 24 and 25 which are located in the channel portions of the side members 17 and 18.

Due to the fact that the portions 22 and 23 of the side members 17 and 18 are composed of comparatively thin sheet steel, it can be readily observed that they will conform to the slight irregularities in the sheath of the cable 10 and also insure a greater area of contact than could be obtained if these members were continuous.

As shown in Fig. 2, the upper edges 16 of the side members 17 and 18 are ribbed longitudinally to provide a gripping surface for the clamping members 12 and 13. Located in the side members 17 and 18 are a series of embossings 30, 31, 32 and 33 to further strengthen and prevent the bending of the members 22 and 23 when the nuts 28 and 29 are tightened down thereon.

It has been found in actual trial installations that a considerable amount of time and labor is saved by the use of this device. Due to the fact that the means for securing the cable supporting device to the strand is wholly independent of the means for securing the cable in the device the sheath of the cable will not be damaged, consequently the life of the cable will be materially increased.

It has been found in numerous trial installations that this supporting device will hold the largest size of aerial cable on the steepest grade without the slightest injury to the cable sheath.

Applicant's improved cable supporting device is such a vast improvement over the present devices of this nature that it has been adopted as standard for use in the Bell system.

While there is shown and described herein the preferred embodiment of the invention it is understood that it is not limited or confined to the precise details of construction herein disclosed, as various modifications may be made without departing from the spirit of the invention.

What is claimed is:

1. In a cable supporting device adapted to be secured to a supporting strand, a pair of clamping members, longitudinal grooves in each of said members, means in said clamping members for securing them together, a pair of cable receiving members secured in certain of said grooves and means located at the bottom of said cable receiving members for securing the cable therein.

2. In a cable supporting device adapted to be secured to a supporting strand, a pair of clamping members, longitudinal grooves in each of said members, means passing through said members for securing them together, a pair of cable receiving members rigidly secured at their upper edges in certain of said grooves and means passing through the lower edges of said members for compressing said cable receiving members around said cable.

3. In a cable supporting device adapted to be secured to a supporting strand, a pair of clamping members, upper and lower grooves in each of said members, means passing through said members for securing them together, the upper grooves arranged to grip the supporting strand while the lower grooves are arranged to grip the upper edges of a pair of cable receiving members, said cable receiving members comprising two metallic side pieces conforming to the shape of the cable to be supported and means located in the bottom edges of said members for securing the cable therein.

4. In a device for suspending aerial cable from a supporting strand, a pair of clamping members, upper and lower grooves in each of said members, means passing through said members for securing them together, the upper pair of grooves arranged to grip the supporting strand and the lower pair of grooves arranged to grip the upper edges of a pair of cable receiving members, said cable receiving members comprising a pair of metallic members having ribs at their upper edges for engagement with the clamping members, and said members curved to conform to the shape of the cable, slots in said side members for forming a plurality of gripping surfaces and to conform to slight irregularities in the cable sheath and means located in the lower edges of said members for securing said cable therein.

5. In a device for suspending aerial cable from a supporting strand, a pair of clamping members, upper and lower grooves in each of said members, means passing through said members for securing them together, the upper pair of grooves arranged to grip the supporting strand and the lower pair of grooves arranged to grip the upper edges of a pair of cable receiving members, said cable receiving members comprising a pair of metallic members, having ribs at their upper edges for engagement with the clamping members, said members curved to conform to the shape of the cable, slots in said members for forming a plurality of gripping surfaces, the lower edges of the side members bent to form channel portions therein and means passing through said channel portions for securing the cable therein.

6. A device for supporting aerial cable comprising a pair of clamping members having upper and lower longitudinal grooves therein, securing means passing through said members, the upper pair of grooves arranged to grip a supporting strand and the lower pair of grooves arranged to grip the upper edges of a pair of cable receiving members, said strand and cable receiving members secured between said clamping members by said securing means and means located in the lower edges of said cable receiving members for securing the cable therein, said means being independent of the means for securing the clamping and cable receiving members to the supporting strands.

In witness whereof, I hereunto subscribe my name this 26th day of February, 1931.

EVERETT ST. JOHN.